(12) United States Patent
Kawamoto

(10) Patent No.: US 7,181,240 B2
(45) Date of Patent: Feb. 20, 2007

(54) TERMINAL APPARATUS, COMMUNICATION TERMINAL APPARATUS, AND PROGRAM

(75) Inventor: Kyoichi Kawamoto, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 94 days.

(21) Appl. No.: 11/087,003

(22) Filed: Mar. 21, 2005

(65) Prior Publication Data
US 2005/0212983 A1 Sep. 29, 2005

(30) Foreign Application Priority Data
Mar. 26, 2004 (JP) ............................. 2004-090912

(51) Int. Cl.
*H04M 1/00* (2006.01)
*H04B 1/38* (2006.01)

(52) U.S. Cl. .............................. 455/556.1; 455/556.2; 455/566; 455/550.1; 455/90.3; 455/466; 455/575.1; 348/14.01; 348/14.02; 348/14.04; 379/433.04

(58) Field of Classification Search ............. 455/556.1, 455/556.2, 566, 550.1, 90.3, 466, 575.1; 348/14.01, 14.02; 379/433.04
See application file for complete search history.

(56) References Cited

U.S. PATENT DOCUMENTS 6,766,182 B2 * 7/2004 Janninck et al. .......... 455/575.3

2005/0096082 A1 * 5/2005 Chang ..................... 455/550.1

FOREIGN PATENT DOCUMENTS

| JP | 2003-319043 A | 11/2003 |
|----|---------------|---------|
| KR | 2003-0030619 A | 4/2003 |
| KR | 2003-0060251 A | 7/2003 |

* cited by examiner

*Primary Examiner*—Erika A. Gary
*Assistant Examiner*—Julio Perez
(74) *Attorney, Agent, or Firm*—Frishauf, Holtz, Goodman & Chick, P.C.

(57) ABSTRACT

When a terminal apparatus such as a cellular phone having a main body and a subsidiary body provided with a display unit, receives a digital terrestrial television broadcasting signal including multiplexed video data and text data, an image process is executed to display an image of the video data on an upper half portion of the display unit and to display an image of the text data on a lower half portion of the display unit, when the subsidiary body is kept in a first transit position while the main body is kept in a fixed position. When the subsidiary body is kept in a second transit position while the main body is kept in a fixed position, the image process is executed so as to display the image of the video data on the entire area of the display unit and to display the image of the text data on the displayed image of the video data in an overlapping manner.

10 Claims, 8 Drawing Sheets

TERMINAL APPARATUS, COMMUNICATION TERMINAL APPARATUS, AND PROGRAM

CROSS-REFERENCE TO RELATED APPLICATIONS

This application is based upon and claims the benefit of priority from the prior Japanese Patent Application No. 2004-90912, filed Mar. 26, 2004, the entire contents of which are incorporated herein by reference.

BACKGROUND OF THE INVENTION

1. Field of the Invention

The present invention relates to a terminal apparatus, communication terminal apparatus, and program for receiving a television broadcasting signal such as a terrestrial digital broadcasting signal.

In recent years, products, such as terminal apparatuses including cellular phones, are widely used, which have a digital camera function including an optical element such as a lens, an image pick-up element such as CCD, and a built-in image memory in addition to a function of transmittance/receipt of telephone calls and e-mails. Further, with advancement in technologies of flexible printing substrates and wiring technologies, cellular phones have been widely used, which have a main body including electronic parts and key switches and a subsidiary body including a liquid crystal display, which are coupled together with a hinge unit and can be kept in a folded state or in a unfolded state.

Japanese Laid-Open Patent Application No. 2003-319043 (Patent Document) discloses a cellular phone of a foldable type, which has a lower side unit provided with a manipulating section and an upper side unit provided with a display unit, both units being coupled together by a hinge unit allowing them to take an open state and/or a closed state. The upper side unit is provided with the display unit, a supporting section and a rotary/sliding mechanism. The display unit has a display screen for a display section. A pair of front cameras disposed on the display unit are arranged to take positions upper and lower to the display section when the display section is kept in a portrait format, and to take positions right and left to the display section when the display section is rotated/slid to take a landscape format.

Patent Document explains that the arrangement will yield advantageous effect that a display device can be used with a portrait format or a landscape format without any limitation, advantageous effect that allows easy three-dimension image processing, and advantageous effect that, when the cellular phone is used as a television phone, one of the pair of cameras of the display unit is arbitrarily selected depending on a calling party to transfer a right or left side facial expression.

In the arrangement, it is simply determined depending on the orientation of the display unit (a portrait or landscape orientation), from which corner of the display unit pixels forming an image photographed by the pair of cameras are disposed to display the image on the display unit. That is, even though an image of data obtained by photographing the same scenery is displayed on the display unit, the display screen of the displayed image is completely changed in height and/or width depending on the display format (portrait or landscape format) of the display unit.

In some area of Japan, the terrestrial digital broadcasting has started since December, 2003. In case the cellular phones capable of receiving the terrestrial digital broadcasting signal are put on the market, the display image on the display unit, as changes in height and/or width depending on the display format (portrait and landscape format) of the display unit, does not conforms with the TV broadcasting standard and therefore is not allowed.

SUMMARY OF THE INVENTION

The theme of the present invention resides in displaying in a normal state an image of the terrestrial digital broadcasting signal having the same size in height and width regardless of the display format (portrait and landscape format) of the display section, and in controlling image display of the terrestrial digital broadcasting signal consisting of multiplexed video data and text data to display a television image which are easy to view for those mainly viewing video information and for those mainly viewing text information.

The arrangement of the present invention receives the television broadcasting signal consisting of multiplexed video data and text data and displays the received video data and text data on its display unit provided on a subsidiary body. The arrangement has a mechanism which keeps the subsidiary body in a first transit position or in a second transit position depending on operation by a user. An image process is executed such that, while the subsidiary body remains in the first transit position, the received video data is displayed on a portion of a display area of the display unit and the received text data is displayed on other portion of the display area of the display unit, and that, while the subsidiary body remains in the second transit position, the received video data is displayed on the entire display area of the display unit and the received text data is displayed on the displayed video data in an overlapping manner.

DETAILED DESCRIPTION OF THE PREFERRED EMBODIMENTS

Now, a cellular phone according to an embodiment of the present invention will be described by way of example with reference to FIGS. 1 through 8.

Figure 1A:
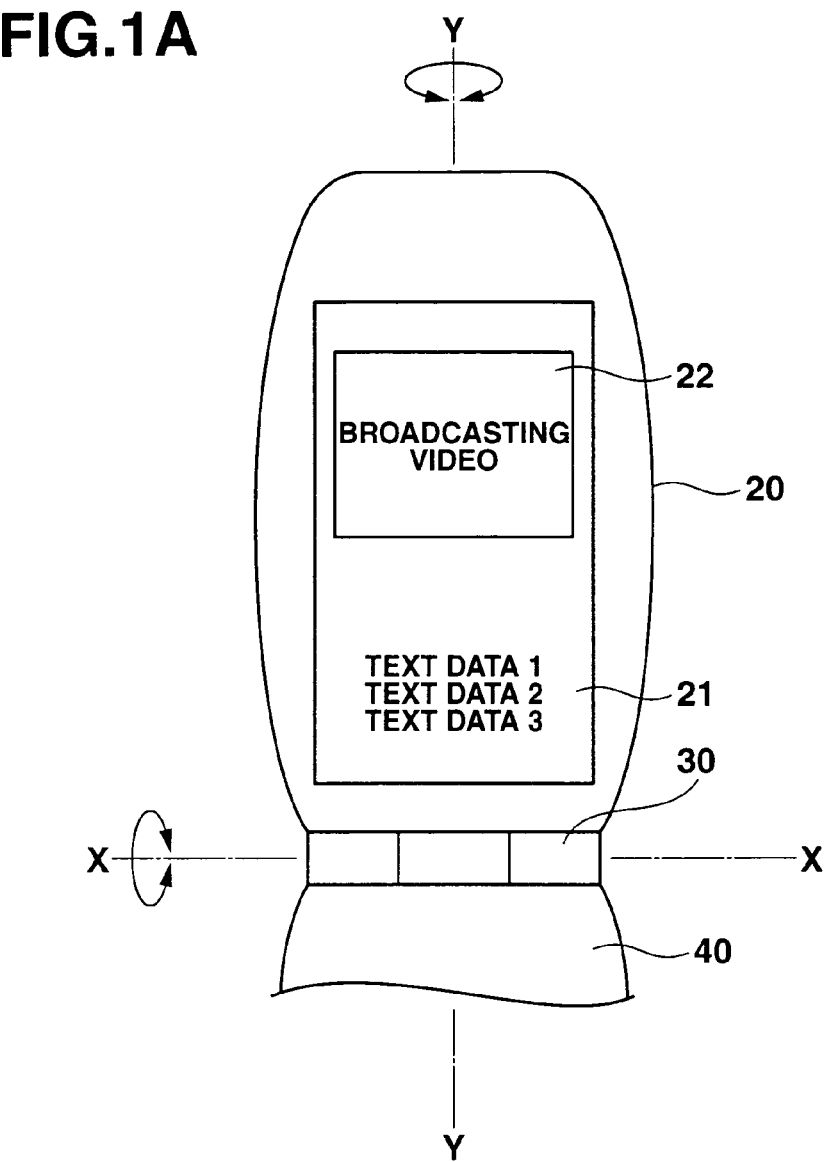
FIGS. 1A and 1B are external views each illustrating a relationship between a transit position of a subsidiary body and a display screen on a display unit of the subsidiary body in a cellular phone according to an embodiment of the invention.
Figure 1B:
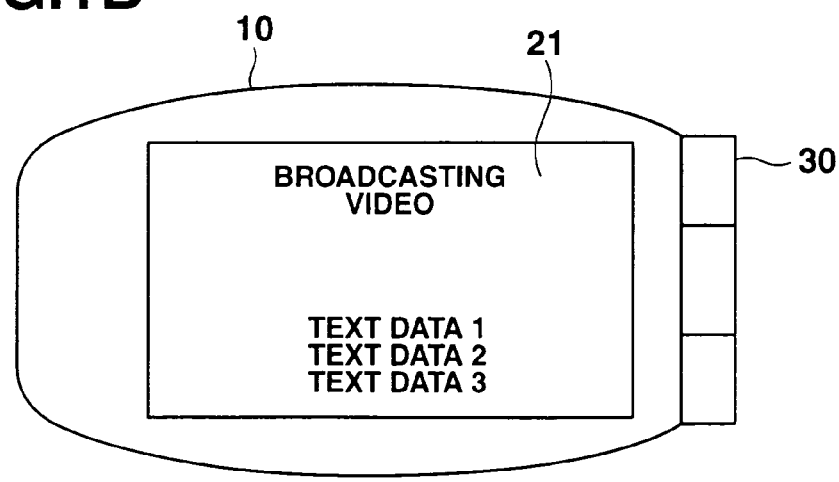

FIG. 1A and FIG. 1B are views illustrating the cellular phone according to the embodiment, with a broadcasting image and text information of the terrestrial digital broadcasting displayed on its display section. The cellular phone comprises a subsidiary body 20 having a LCD (liquid crystal display) serving as a display unit and a main body 40 in which electronic elements such as CPU, IC and the like and a key switch are mounted. The subsidiary body 20 is pivotably coupled to the main body 40 by means of a hinge unit 30 of a double-shaft structure. The hinge unit of a double-shaft structure has a structure which is widely used, for example, in toy industry and others, and is increasingly employed in cellular phones. The hinge unit of a double-shaft structure has no novel mechanism and therefore detailed description thereof will be omitted. The subsidiary body 20 and main body 40 are coupled to each other in such a manner that either one is rotable relatively to the other about one shaft of the hinge unit 30 arranged in the direction indicated by broken line (X-axis in FIG. 1A) so as take an open position or a closed position, and that the subsidiary body 20 is rotable relatively to the main body 40 about other shaft of the hinge unit 30 arranged in the direction indicated by broken line (Y-axis in FIG. 1A). FIG. 1A is a view illustrating the cellular phone with the subsidiary body 20 taking the open position, exposing a display unit 21. FIG. 1B is a view illustrating the cellular phone with the subsidiary body 20 taking the closed position, exposing the display unit 21.

Figure 2A:
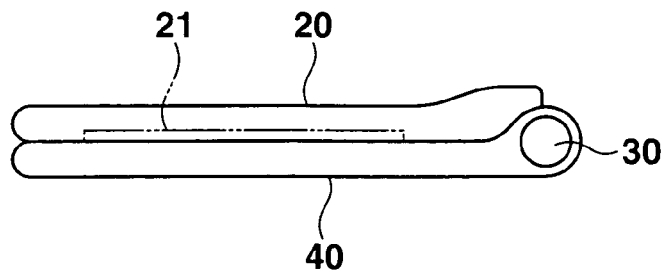
FIGS. 2A to 2C are views illustrating how the subsidiary body is opened while a main body is kept in a fixed position in the cellular phone according to the embodiment of the invention.
Figure 2B:
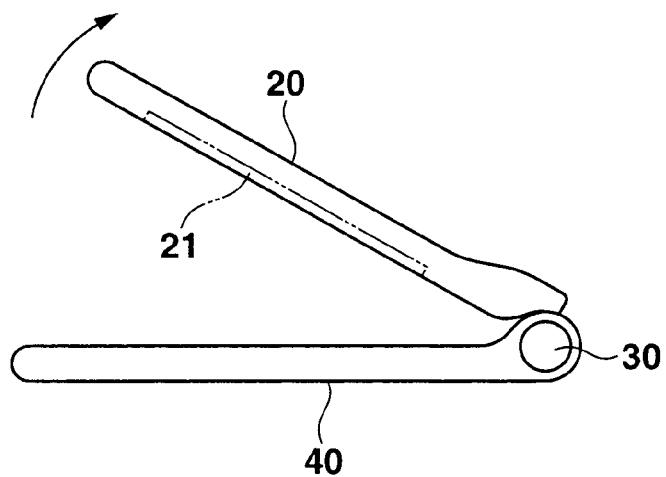
Figure 2C:
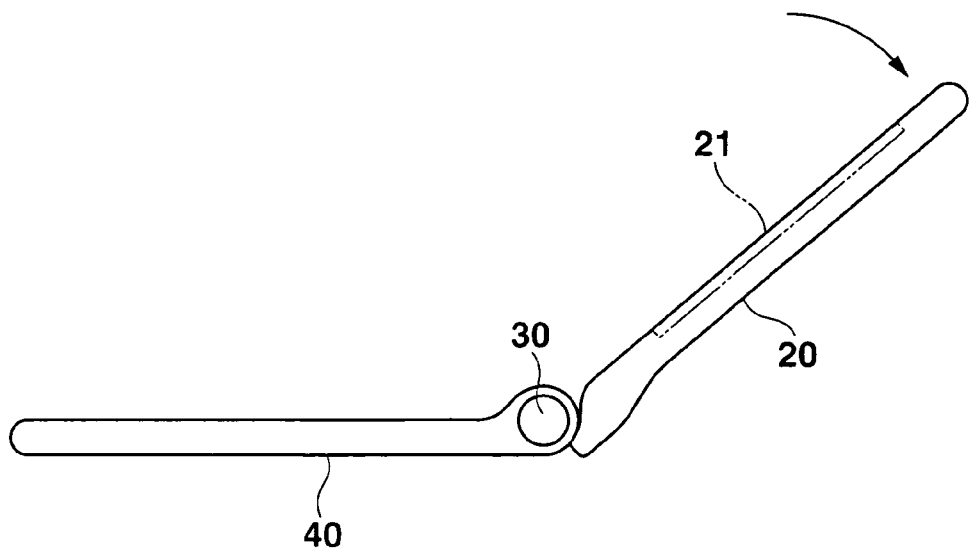
Figure 3A:
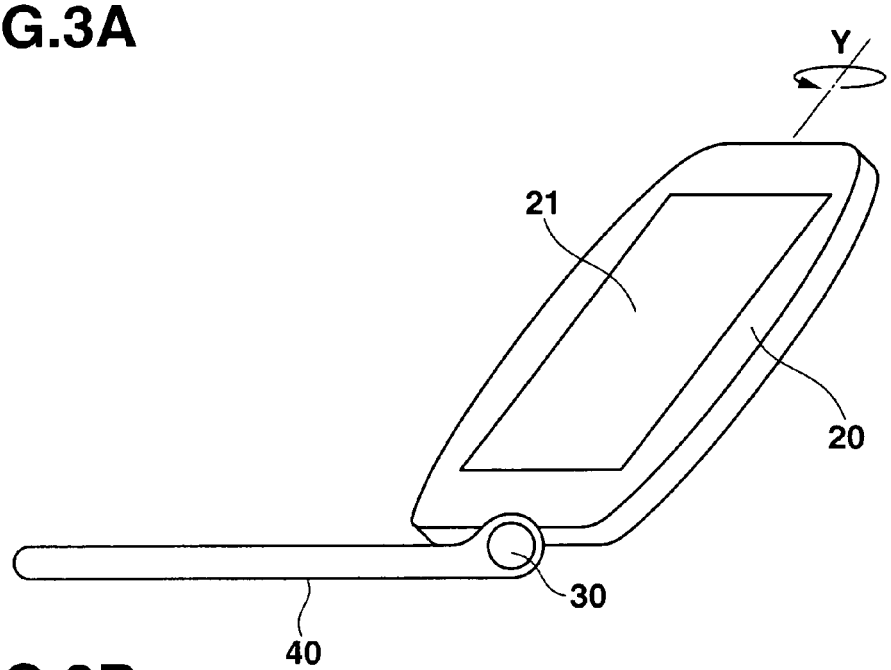
FIGS. 3A to 3B are views illustrating how the opened subsidiary body is rotated while the main body is kept in a fixed position in the cellular phone according to the embodiment of the invention.
Figure 3B:
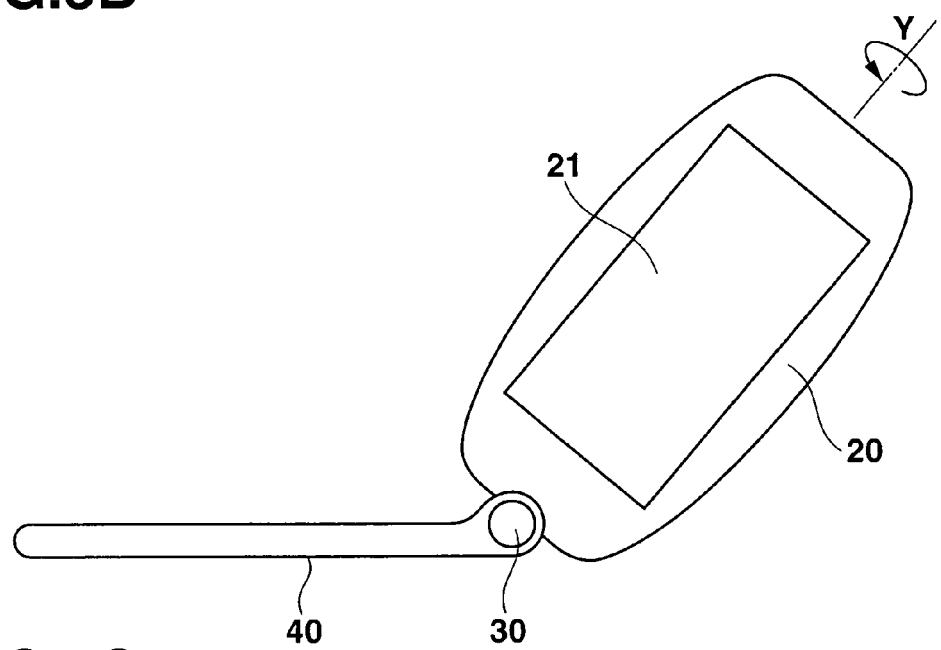
Figure 3C:
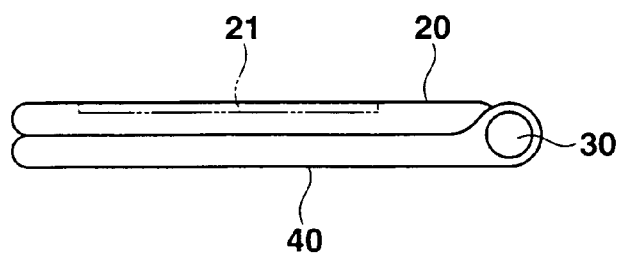
FIG. 3C is a view illustrating the cellular phone in a closed state with the display unit of the subsidiary body exposed.

Relationship between the display unit 21 and transit states of the subsidiary body 20 of the cellular phone shown in FIGS. 1A and 1B will be described with reference to FIGS. 2A to 2C and FIGS. 3A to 3B. FIGS. 2A to 2C are views illustrating the transit states in which the subsidiary body 20 provided with the display unit 21 is opened from the closed position while the main body 40 is kept in a fixed position. FIGS. 3A to 3B are views illustrating the transit states in which the subsidiary body 20 is rotated to expose the display unit 21 after the subsidiary body 20 is opened, and illustrating the cellular phone with the subsidiary body 20 closed.

In the cellular phone with the subsidiary body 20 closed, as shown in FIG. 2A, the display unit 21 is kept facing the main body 40. In this state, the display unit 21 is hidden and a screen of the display unit 21 cannot be seen. When the subsidiary body 20 is opened as illustrated in FIG. 2B to the position shown in FIG. 2C, then the display unit 21 can be seen as shown in FIG. 1A. A user is allowed to write a mail by operating character input pads provided on the main body 40 with the subsidiary body 20 opened (shown in FIG. 1A), to display the written mail on the display unit 21, and to transmit the mail by operating a transmission switch. The user is also allowed to display a received mail on the display unit 21 and to save or delete the mail by operating a save switch or a delete switch. Further, when the subsidiary body 20 is rotated in the direction indicated by an arrow as shown in FIGS. 3A and 3B while the main body 40 is kept in a fixed position, and the subsidiary body 20 is brought to the closed position with the display unit 21 exposed, as illustrated in FIG. 2C, the cellular phone is closed with the display unit 21 exposed as illustrated in FIG. 1B.

Figure 4:
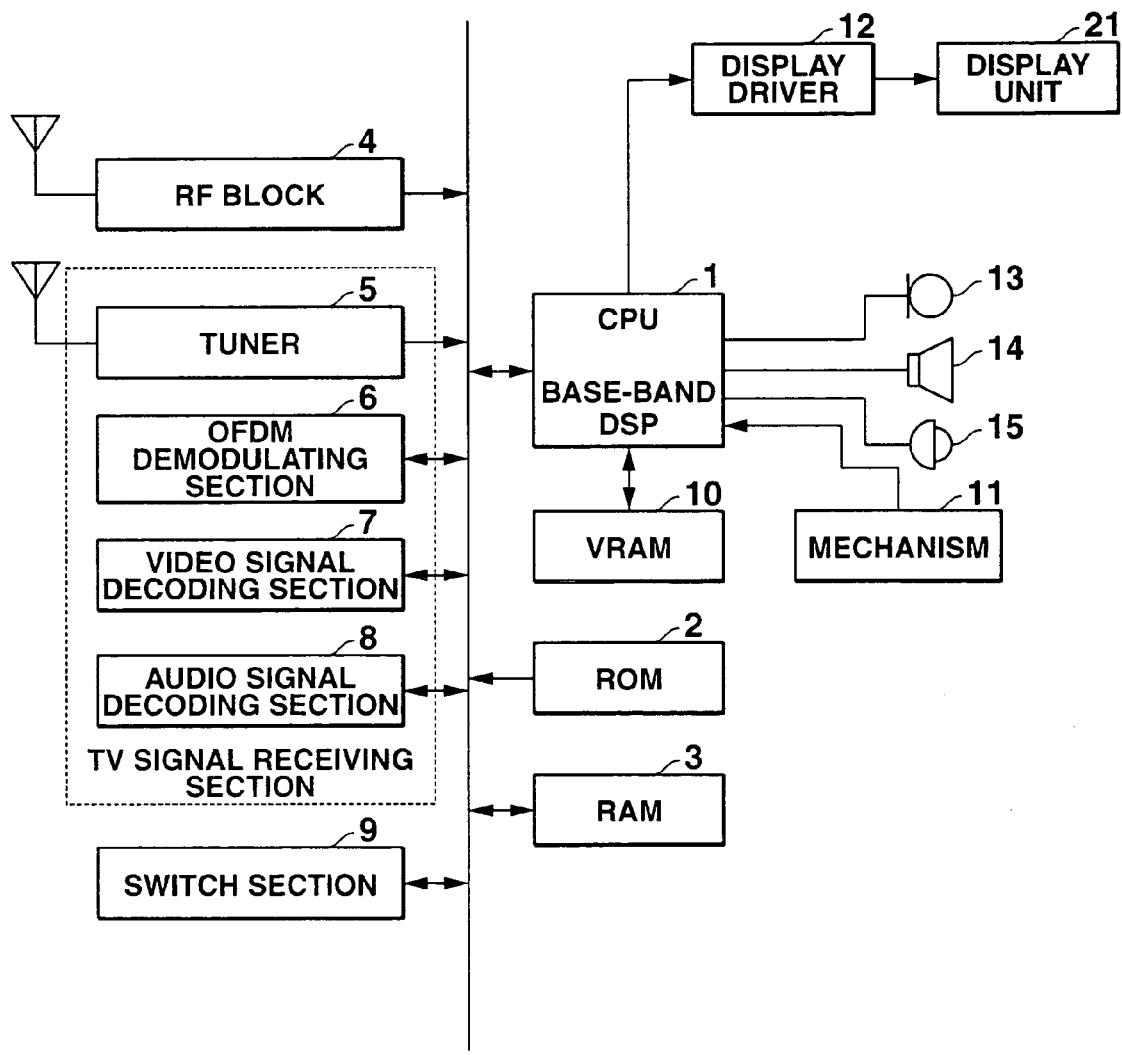
FIG. 4 is a block diagram of a circuit configuration of the cellular phone according to the embodiment of the invention.

FIG. 4 is a block diagram showing a configuration of the cellular phone shown in FIG. 1.

CPU 1 shown in FIG. 1 consists of a single chip IC containing a digital signal processor (DSP) for processing a base band signal and an AD converter. A system bus of CPU 1 is connected with ROM 2, RAM 3, RF Block 4, a tuner 5, OFDM (orthogonal frequency division multiplex) demodulating section 6, a video signal decoding section 7, audio signal decoding section 8 and switch section 9. VRAM (video RAM) 10 and a mechanism 11 including the hinge unit 30 (shown in FIGS. 1 and 3), a displacement sensor and a power source control switch (not shown) are connected to ports of CPU 1. The displacement sensor serves to detect positions of the subsidiary body 20 relative to the main body 40 as shown in FIG. 2A, FIG. 2C or FIG. 1A, and FIG. 3C or FIG. 1B. Several arrangements for the displacement sensor have been widely known. For example, as shown in Japanese Laid-open Patent Specification No. 2003-319043, an arrangement using a magnet and a magnetic sensor may be used as the displacement sensor. An arrangement which uses a proximity sensor consisting of combination of an infrared light-emitting diode and a photo-transistor may be used for the displacement sensor. Further, an arrangement using a mechanical switch may be used as the displacement sensor.

The tuner 5, OFDM demodulating section 6, video signal decoding section 7 and audio signal decoding section 8, surrounded by broken line in FIG. 4 compose a television-signal receiving section for receiving a video/audio signal of the terrestrial digital broadcasting. The television-signal receiving section has a power source independent of that of the cellular phone.

CPU 1 is connected to the display unit 21 through a display driver 12. The present cellular phone comprises a main body (the main body 40 shown in FIGS. 1A and 1B, and in FIGS. 2A to 2C) containing electronic parts such as CPU 1 and the switch section 9, and a subsidiary body (the subsidiary body 20 shown in FIGS. 1A and 1B, and in FIGS. 2A to 2C) having the display unit 21. The main body and the subsidiary body are coupled such that both bodies can take the open position or closed position by means of the hinge unit 30 or a folding mechanism included in the mechanism 11. The main and subsidiary body are provided with a microphone 13, speaker 14 and ear phone 15, which are connected to CPU 1 through drivers (not shown).

On ROM 2 are stored a program for executing a communication control process for telephone call and/or transmitting/receiving mails to or from another cellular phone, a program for executing signal processing operation including a signal receiving process for receiving the terrestrial digital broadcasting, a display process for displaying received image data, and an audio signal process, and default values for initialization. RAM 3 is a work area of CPU 1 and is provided with a buffer area for temporarily storing data processed by CPU 1, an area for various kinds of resistors and flags, an area for storing mails to be transmitted, and an area for storing received mails. RF block 4 is provided with a radio signal transmitting/receiving section, radio signal processing section, and audio signal processing section (not shown), which are prepared as constituting elements for transmitting and or receiving telephone calls and mails to or from a telephone communication network.

The tuner 5 executes a signal processing to receive the terrestrial digital broadcasting and to amplify a high frequency signal. OFDM demodulating section 6 demodulates the OFDM modulated signal supplied from the tuner 5 to output coded data of a video and audio signal of the terrestrial digital broadcasting. The video signal decoding section 7 decodes the coded data of a video signal output from OFDM demodulating section 6 to output digital video data to CPU 1. CPU 1 processes the digital video data from the television-signal receiving section, and outputs the processed video data to the display unit 21 through the display driver 12 to display a television image. The audio signal decoding section 8 decodes coded data of an audio signal from the OFDM demodulating section 6 to output digital audio signal to CPU 1. CPU 1 converts the digital audio signal into an analog audio signal to output a television audio signal through the speaker 14 or the ear phone 15. Meanwhile, CPU 1 notifies incoming call through the speaker 14, when the RF block 4 detects an incoming call.

The switch section 9 comprises a key switch group including an off-hook switch, on-hook switch, outgoing switch, cursor switch, execution switch, clear switch, and numeral switch. One of the switches is also used as a television switch. The microphone 13 converts a user's voice into an electric signal in a telephone-call process and sends the electric signal to CPU 1. VRAM 10 has an area A for storing video data of one frame and text data of the terrestrial digital broadcasting, and an area B for storing data of one frame to be actually displayed on the display unit 21. CPU 1 subjects the data stored on the area A to an image processing, and stores the processed data on the area B. This image processing will be described later. An arrangement that makes RAM 3 execute the performances of VRAM 10 may be adopted.

Now, operation of transmitting/receiving a phone call and a mail in the cellular phone as well as a data process of processing video data received from the terrestrial digital broadcasting will be described with reference to flow charts of FIGS. 5 through 8 to be executed by CPU 1.

Figure 5:
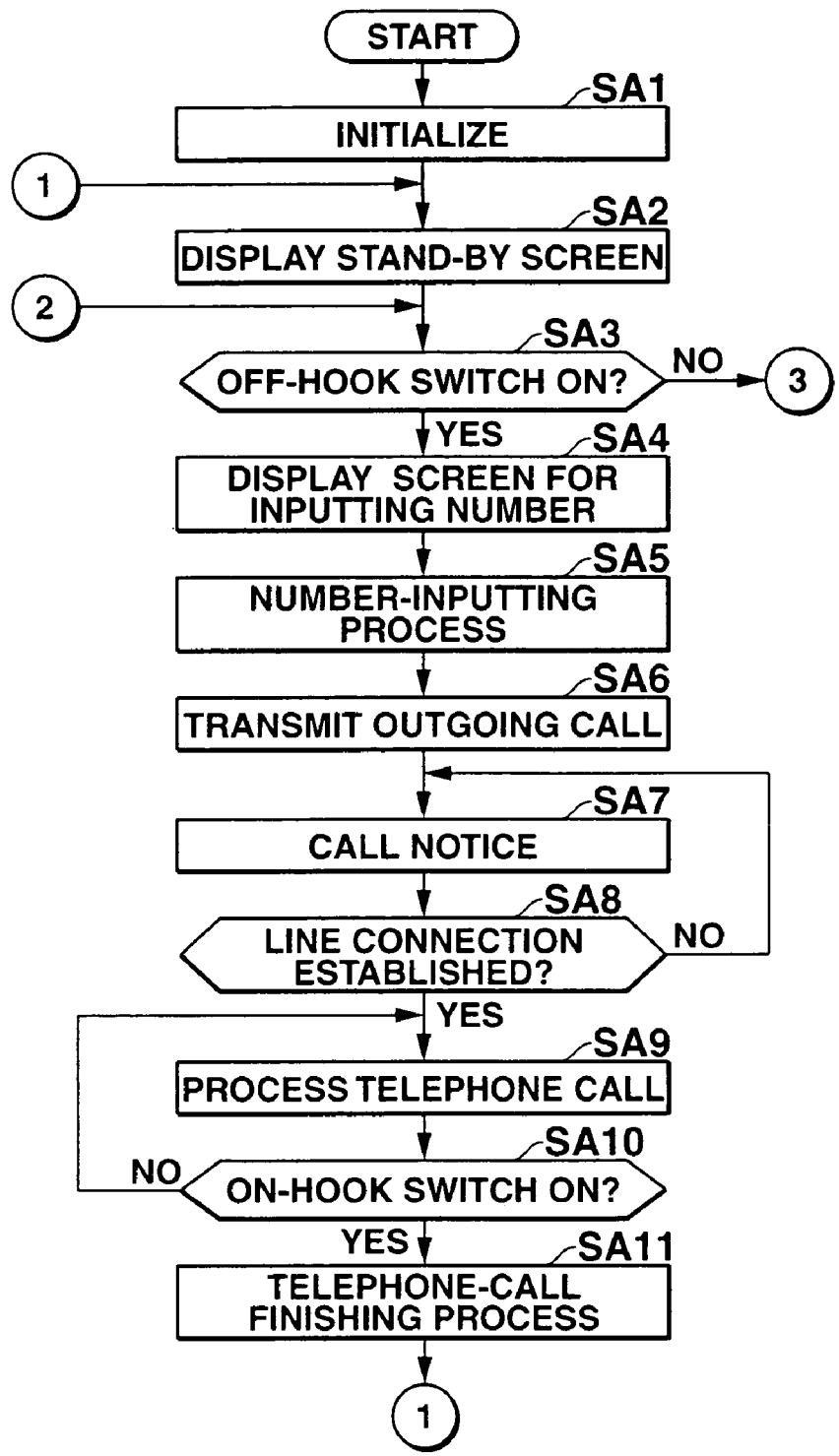
FIG. 5 is a flow chart of a main routine of CPU, showing operation of the cellular phone according to the embodiment of the invention.
Figure 6:
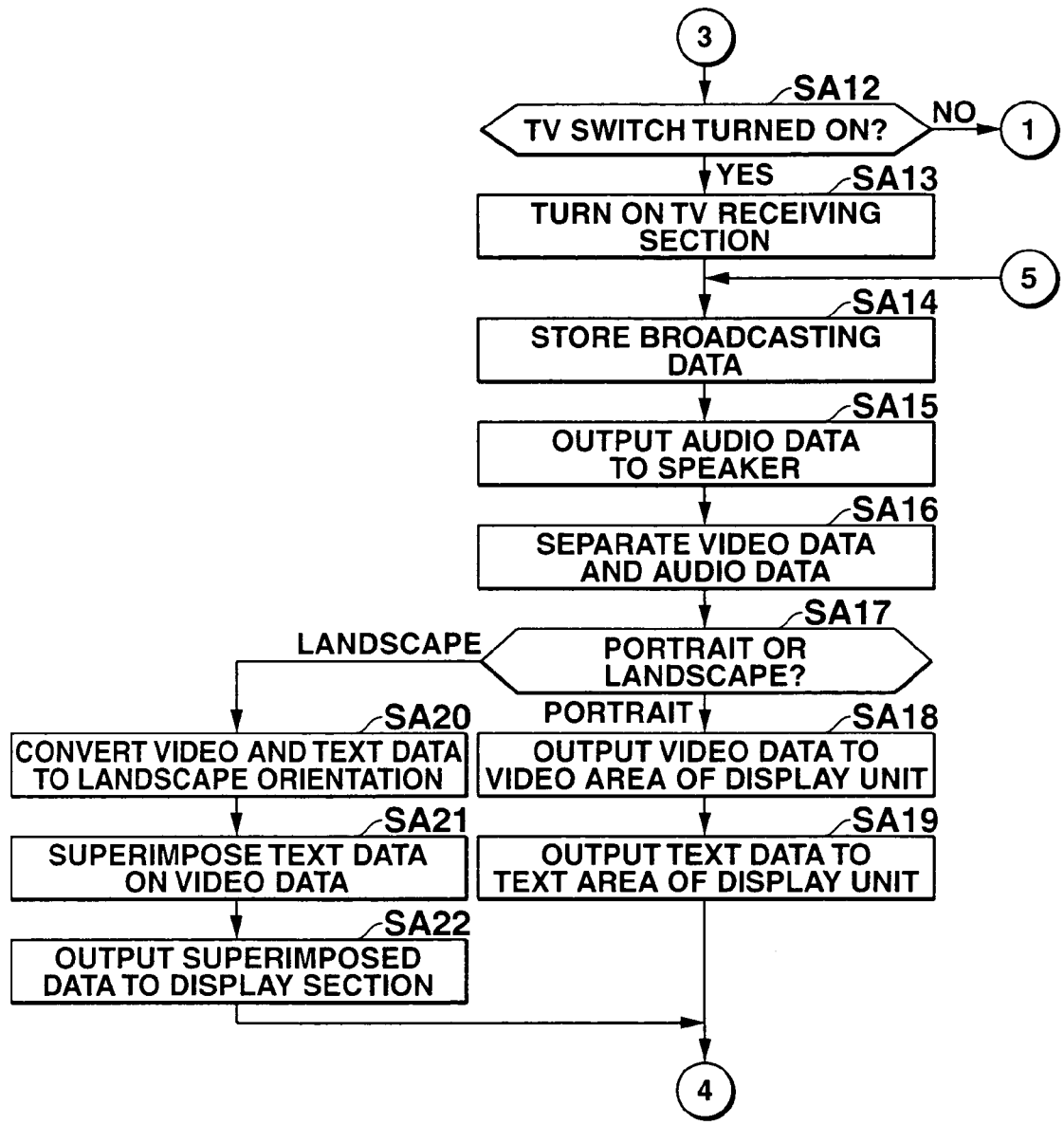
FIG. 6 is a flowchart of the main routine of CPU, following to the flow chart of FIG. 5.
Figure 7:
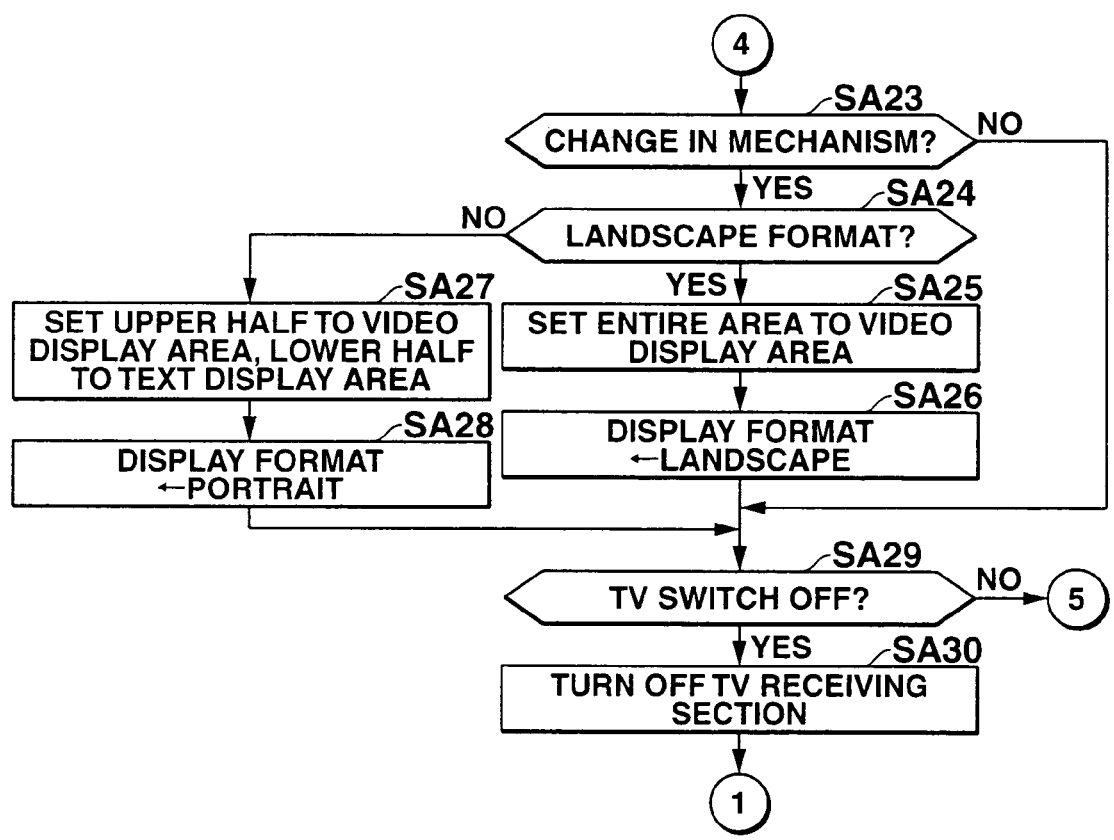
FIG. 7 is a flowchart of the main routine of CPU, following to the flow chart of FIG. 6.

FIGS. 5 through 7 are flow charts of a main routine executed by CPU 1. When the subsidiary body 20 is brought to the open position with respect to the main body 40, that is, when the cellular phone is opened, and the power switch is turned on, a predetermined initialization is performed at step SA1 (FIG. 5) and a stand-by screen is displayed on the display unit 21 at step SA2. It is judged at step SA3 whether or not the off-hook switch has been operated. When the off-hook switch has been operated, a phone-number input screen is displayed on the display unit 21 at step SA4. When a phone number is entered by operating the switch section 9, a number-inputting process is executed at step SA5. Then, an outgoing call is transmitted to the telephone network at step SA6. A call notice is output through the speaker 14 at step SA7. While the call is notified, it is judged at step SA8 whether or not a line connection to the addressee has been established in response to the transmission of outgoing call. When the line connection has been established, operation advances to a telephone-call process to transmit and/or receive audio signals at step SA9.

During the telephone-call process, it is judged at step SA10 whether or not the on-hook switch has been operated. When the on-hook switch has been operated, a telephone-call finishing process is executed to break the line connection at step SA11. After the telephone-call finishing process has been executed, the operation returns to step SA2, where the stand-by screen is displayed on the display unit 21 again. When the off-hook is not operated at step SA3, it is judged at step SA12 in FIG. 6 whether or not the television switch has been turned on. When the television switch has been operated, the television-signal receiving section is turned on at step SA13, broadcasting data is obtained from the terrestrial digital broadcasting received by the television-signal receiving section. The broadcasting data of one frame consisting of video data and text data is stored on the area A of VRAM 10 at step SA14. Audio data derived from the broadcasting data is output to the speaker 14 at step SA15, and video data and text data are separated from the broadcasting data at step SA16.

Now, the displacement sensor judges at step SA17 whether the current display format has a landscape orientation or a portrait orientation, and the resultant of the judgment by the displacement sensor is set to a display-format flag. In case that the current display format has a portrait orientation, the image process is executed such that the video data is loaded on VRAM 10 so as to display a display screen as illustrated in FIG. 1A. More particularly, video data is output to a video area 22, that is, the upper half of the display unit 21 to be displayed thereon at step SA18 and text data is output to a text area, that is, the lower half of the display unit 21 to be displayed thereon at step SA19. Meanwhile, in case that the current display format has a landscape orientation, the image process is executed such that the video data is loaded on VRAM 10 so as to display a display screen as illustrated in FIG. 1B. More particularly, video data and text data are converted into data each having a landscape orientation at step SA20, and the text data is superimposed on the video data at step SA21. The video data with the text data super imposed thereon is output to the display unit 21 at step SA22.

After the data has been output to the display unit 21 at step SA19 or at step SA22, it is judged at step SA23 in FIG. 7 whether any change has been caused to the mechanism of the cellular phone by user's operation. In other words, it is judged at step SA23 whether the subsidiary body 20 has been moved with respect to the main body 40. When the position of the subsidiary body 20 has been changed, it is judged at step SA24 whether the display unit 21 of the moved subsidiary body 20 has been changed from a portrait format to a landscape format or from a landscape format to a portrait format. When the display unit 21 is changed from a portrait format to a landscape format, then the entire area of the display unit 21 is set to a video-display area at step SA25, and the display-format flag is set to indicate a landscape format at step SA26. Meanwhile, when the display unit 21 is changed from a landscape format to a portrait format, the upper half display area 22 of the display unit 21 is set to the video-display area and the lower half area is set to a text area at step SA27. The display-format flag is set to indicate a landscape format at step SA28.

After the display-format flag has been set at step SA26 or at SA28, or when it is determined at step SA23 that the position of the subsidiary body 20 has not been changed, it is judged at step SA29 whether the television switch has been turned off. When the television switch has not been turned off, the operation returns to step SA14 in FIG. 6, and a loop process from step SA14 (FIG. 6) to step SA29 (FIG. 7) is executed. When it is determined at step SA29 that the television switch has been turned off, the television-signal receiving section is turned off at step SA30 and the operation returns to step SA2 (FIG. 5), where the stand-by screen is displayed.

Figure 8:
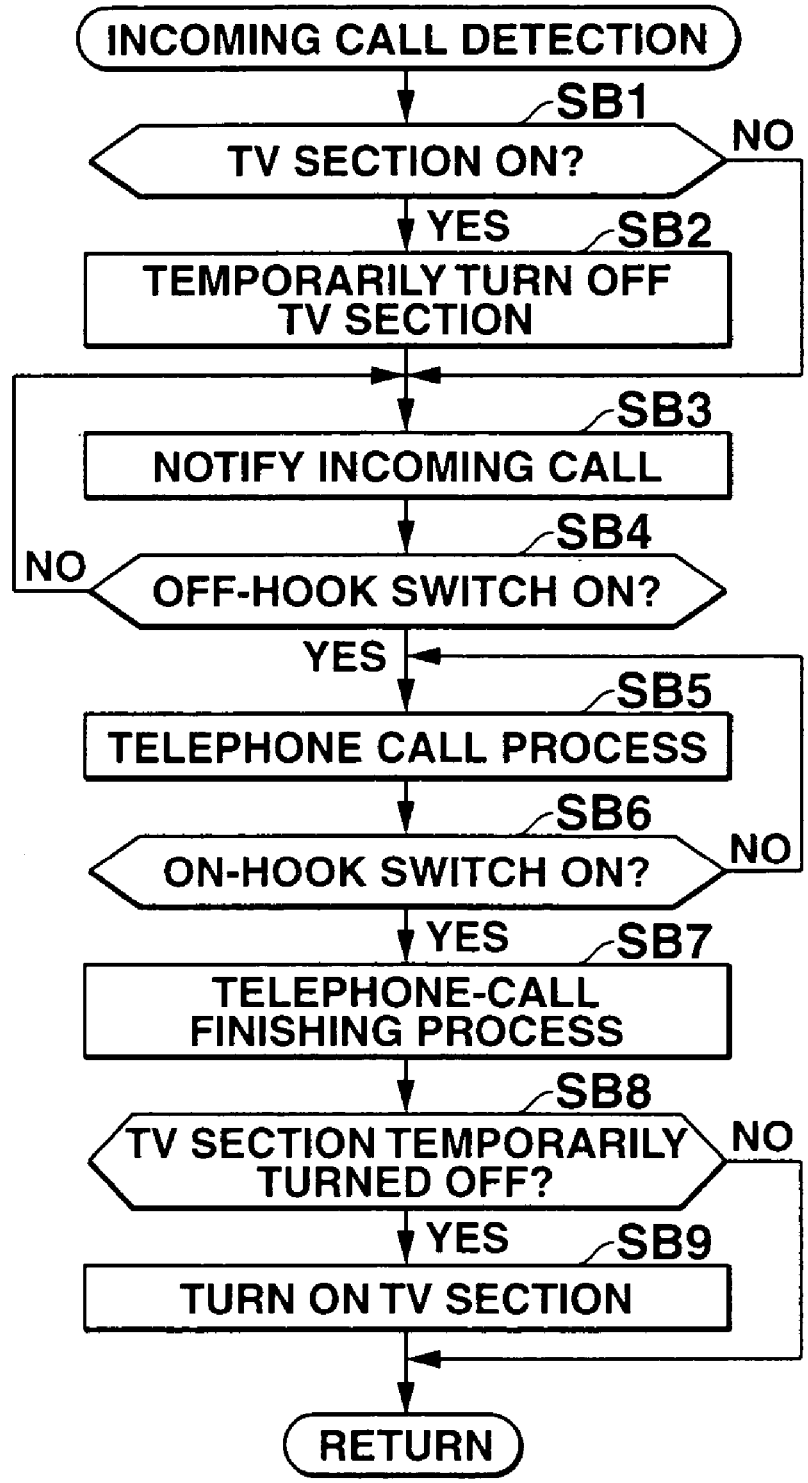
FIG. 8 is a flow chart of an incoming call notifying process of CPU.

FIG. 8 is a flow chart of an incoming-call detecting process. When the RF block 4 detects an incoming call, it is judged at step SB1 whether the television-signal receiving section has been turned on. When the television-signal receiving section is on, the television-signal receiving section is temporarily turned off. When the television-signal receiving section is off, or after the television-signal receiving section is temporarily turned off, an incoming call is notified through the speaker 16 at step SB3. Then, it is judged at step SB4 whether the off-hook switch has been operated or not. When the off-hook switch has been operated, a notice of an incoming call is ceased, and line connection with a calling party is established to execute the telephone-call process at step SB5. In the telephone-call process, it is judged at step SB6 whether the on-hook switch has been operated. When the on-hook switch has been operated, the telephone-call finishing process is executed at step SB7 to break the line connection, and it is judged at step SB8 whether the television-signal receiving section is temporarily turned off or not. When the television-signal receiving section is temporarily turned off, the television-signal receiving section is returned to on at step SB9. After the television-signal receiving section is turned on, or in case that the television-signal receiving section has not been temporarily turned off but has been in off state since an incoming call was not received, the operation returns to the main routine process.

As has been described, according to the embodiment of the invention, in case that the television-signal receiving section receives the terrestrial digital broadcasting signal containing video data and text data to display the video data and text data on the display unit 21, CPU 1 executes the image process, displaying the video data on the upper half display area 22 of the display unit 21 and the text data on the lower half display area of the display unit 21, when the subsidiary body 20 having the display unit 21 is set to the position shown in FIG. 1A. When the subsidiary body 20 is set to the position shown in FIG. 1B, CPU 1 executes the image process so as to display the video data on the entire display area of the display unit 21 and to display the text data on the displayed video data in an overlapping manner.

Therefore, since a horizontal and vertical size of a display image of received broadcasting data are fixed, an image of the terrestrial digital broadcasting signal can be displayed in a normal state regardless of a portrait format or landscape format of the display unit. Further, display of text data multiplexed with video data in the terrestrial digital broadcasting signal is controlled to provide a television image easy to view for users who have much interest in video information or for those having much interest in text information.

The mechanism 11 comprises the hinge unit 30 which couples the subsidiary body 20 to the main body 40 such that the display unit 20 rotates to take an open position with respect to the main body 40 or a closed position in response to user's operation, and the displacement sensor (not shown) for detecting the subsidiary body 20 which is maintained at the open position but does not rotate while the main body 40 is kept in a fixed position (FIG. 1A) or which is opened to be rotated while the main body 40 is kept in a fixed position (FIG. 1B). Therefore, the user is allowed to view a television image of his or her desired image format (portrait format or landscape format) only by operating the display unit 21 of the subsidiary body 20 without performing setting operation with the switches.

Further, in this case, CPU 1 executes the display control such that the vertical direction of the display image to be displayed in a portrait format while the subsidiary body 21 is kept in the transit position shown in FIG. 1A and the vertical direction of the display image to be displayed in the landscape format while the subsidiary body 21 is kept in the position as shown in FIG. 1B cross at right angles to each other.

Therefore, the user can change the position of the subsidiary body 20 without paying attention to the vertical direction of the display image to be displayed on the display unit 21.

In the cellular phone according to the present embodiment, CPU 1 executes the program for communication control process which is previously stored on ROM 2, but an arrangement may be made such that a program for communication control process is received through the RF block 4, and installed on a nonvolatile memory such as a flash memory, and CPU 1 executes the installed program. In this case, it should be noted that an invention concerning to a program for such communication control process can be made.

What is claimed is:

1. A terminal apparatus comprising:
a display unit having a display area;
a signal receiving section for receiving a television broadcasting signal including multiplexed video data and text data;
an image processing section for performing an image process to process images of the video data and text data received by the signal receiving section to display the images on the display area of the display unit;
a subsidiary body having at least the display unit among elements such as the display unit, the signal receiving section and the image processing section, and a main body having the elements other than those mounted on the subsidiary body;
a mechanical unit for movably coupling the subsidiary body to the main body such that the subsidiary body is allowed to rotate about a first imaginary axis to take at least one of a first and second transit position while the main body is kept in a fixed position in accordance with operation of a user, wherein the image processing section performs the image process to display on a portion of the display area of the display unit the image of the video data received by the signal receiving section and to display on the other portion of the display area of the display unit the image of the text data received by the signal receiving section, when the subsidiary body is kept in the first transit position while the main body is kept in a fixed position, and to display on the entire display area of the display unit the image of the video data received by the signal receiving section and to display the image of the text data received by the signal receiving section on the displayed image of the video data in an overlapping manner, when the subsidiary body is kept in the second transit position while the main body is kept in a fixed position.

2. The terminal apparatus according to claim 1, wherein the mechanical unit comprises a hinge mechanism for movably coupling the subsidiary body to the main body such that the subsidiary body is allowed to rotate about a second imaginary axis other than the first imaginary axis to take the second transit position while the main body is kept in a fixed position in accordance with operation of the user, and a displacement sensor for detecting the subsidiary body in the first transit position where the subsidiary body is rotated about the first imaginary axis to be opened while the main body is kept in a fixed position, and the second transit position where the subsidiary body is rotated about the first imaginary axis to be opened and further rotated about the secondary imaginary axis while the main body is kept in a fixed position.

3. The terminal apparatus according to claim 1, further comprising:
a display control section for controlling a display on the display unit such that the vertical direction of an image to be displayed on the display unit when the subsidiary body is kept in the first transit position while the main body is kept in a fixed position and the vertical direction of an image to be displayed on the display unit when the subsidiary body is kept in the second transit position while the main body is kept in a fixed position cross at right angles to one other.

4. The terminal apparatus according to claim 1, wherein the image processing section performs the image process to display on an upper half of the display area of the display unit an image of the video data received by the signal receiving section and to display on a lower half of the display area of the display unit an image of the text data received by the signal receiving section, when the subsidiary body is kept in the first transit position while the main body is kept in a fixed position.

5. A communication terminal apparatus comprising:
a display unit having a display area;
a signal receiving section for receiving a television broadcasting signal including multiplexed video data and text data;
a communication control section for transferring a signal to or receiving a signal from a telephone communication network;
an image processing section for performing an image process to process images of the video data and text data received by the signal receiving section to display the images on the display area of the display unit;
a subsidiary body having at least the display unit among elements such as the display unit, the signal receiving section, the communication control section, and the image processing section, and a main body having the elements other than those mounted on the subsidiary body;
a mechanical unit for movably coupling the subsidiary body to the main body such that the subsidiary body is allowed to rotate about a first imaginary axis to take at least one of a first and second transit position while the main body is kept in a fixed position in accordance with operation of a user, wherein the image processing section performs the image process to display on a portion of the display area of the display unit the image of the video data received by the signal receiving section and to display on the other portion of the display area of the display unit the image of the text data received by the signal receiving section, when the subsidiary body is kept in the first transit position while the main body is kept in a fixed position, and to display on the entire display area of the display unit the image of the video data received by the signal receiving section and to display the image of the text data received by the signal receiving section on the displayed image of the video data in an overlapping manner, when the subsidiary body is kept in the second transit position while the main body is kept in a fixed position.

6. The terminal apparatus according to claim 5, wherein the mechanical unit comprises a hinge mechanism for movably coupling the subsidiary body to the main body such that the subsidiary body is allowed to rotate about a second imaginary axis other than the first imaginary axis to take the second transit position while the main body is kept in a fixed position in accordance with operation of the user, and a displacement sensor for detecting the subsidiary body in the first transit position where the subsidiary body is rotated about the first imaginary axis to be opened while the main body is kept in a fixed position, and the subsidiary body in the second transit position where the subsidiary body is rotated about the first imaginary axis to be opened and further rotated about the secondary imaginary axis while the main body is kept in a fixed position.

7. The terminal apparatus according to claim 5, further comprising:
a display control section for controlling a display on the display unit such that the vertical direction of an image to be displayed on the display unit when the subsidiary body is kept in the first transit position while the main body is kept in a fixed position and the vertical direction of an image to be displayed on the display unit when the subsidiary body is kept in the second transit position while the main body is kept in a fixed position cross at right angles to one other.

8. The terminal apparatus according to claim 5, wherein the image processing section performs the image process to display on an upper half of the display area of the display unit an image of the video data received by the signal receiving section and to display on a lower half of the display area of the display unit an image of the text data received by the signal receiving section, when the subsidiary body is kept in the first transit position while the main body is kept in a fixed position.

9. In a terminal apparatus having a display unit having a display area, a signal receiving section for receiving a television broadcasting signal including multiplexed video data and text data, an image processing section for performing an image process to process images of the video data and text data received by the signal receiving section to display the images on the display area of the display unit, a subsidiary body having at least the display unit among elements such as the display unit, the signal receiving section and the image processing section, and a main body having the elements other than those mounted on the subsidiary body, and a mechanical unit for movably coupling the subsidiary body to the main body such that the subsidiary body is allowed to rotate about a first imaginary axis to take at least one of a first and second transit position while the main body is kept in a fixed position in accordance with operation of a user, a program for a communication control process, executed by the image processing section comprising:
first step of detecting whether the subsidiary body is kept in the first transit position or in the second transit position while the main body is kept in a fixed position; and
second step of performing the image process to display on a portion of the display area of the display unit the image of the video data received by the signal receiving section and to display on the other portion of the display area of the display unit the image of the text data received by the signal receiving section, when it is determined that the subsidiary body is kept in the first transit position while the main body is kept in a fixed position, and to display on the entire display area of the display unit the image of the video data received by the signal receiving section and to display the image of the text data received by the signal receiving section on the displayed image of the video data in an overlapping manner, when it is determined that the subsidiary body is kept in the second transit position while the main body is kept in a fixed position.

10. In a communication terminal apparatus having a display unit having a display area, a signal receiving section for receiving a television broadcasting signal including multiplexed video data and text data, a communication control section for transferring a signal to or receiving a signal from a telephone communication network, an image processing section for performing an image process to process images of the video data and text data received by the signal receiving section to display the images on the display area of the display unit, a subsidiary body having at least the display unit among elements such as the display unit, the signal receiving section, the communication control section, and the image processing section, and a main body having the elements other than those mounted on the subsidiary body, a mechanical unit for movably coupling the subsidiary body to the main body such that the subsidiary body is allowed to rotate about a first imaginary axis to take at least one of a first and second transit position while the main body is kept in a fixed position in accordance with operation of a user, a program for a communication control process, executed by the image processing section comprising:

first step of judging whether the subsidiary body is kept in the first transit position of in the second transit position while the main body is kept in a fixed position; and second step of performing the image process to display on a portion of the display area of the display unit the image of the video data received by the signal receiving section and to display on the other portion of the display area of the display unit the image of the text data received by the signal receiving section, when it is determined that the subsidiary body is kept in the first transit position while the main body is kept in a fixed position, and to display on the entire display area of the display unit the image of the video data received by the signal receiving section and to display the image of the text data received by the signal receiving section on the displayed image of the video data in an overlapping manner, when it is determined that the subsidiary body is kept in the second transit position while the main body is kept in a fixed position.

* * * * *